Patented June 30, 1942

2,287,904

UNITED STATES PATENT OFFICE 2,287,904

DERIVATIVES OF PHENOLS

Reginald John William Reynolds and Eric Everard Walker, Blackley, Manchester, England, assignors to Imperial Chemical Industries Limited, a corporation of Great Britain No Drawing. Application August 29, 1940, Serial No. 354,698. In Great Britain January 3, 1938

3 Claims. (Cl. 260—624)

This application is a continuation-in-part of our copending application Serial No. 247,944, filed December 27, 1938 (issued October 15, 1940, as Patent No. 2,218,344), and relates to the manufacture of novel condensation products from substituted phenols. More particularly, this invention deals with methylol derivatives of phenols which carry in the nucleus an aliphatic radical having a chain of at least 8 carbon atoms.

It is an object of this invention to prepare novel organic compounds which may be useful in the synthesis of other organic compounds, especially textile treating agents. Further objects of this invention will appear hereinafter.

The novel organic compounds of this invention may be expressed by the general formula

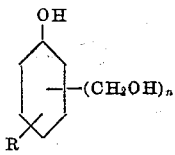

wherein $n$ is an integer less than 3, while R is an aliphatic radical which possessess a chain of at least 8 carbon atoms, directly or indirectly attached to the benzenoid ring, as typified by alkyl, acylamido, and acylamido-methyl.

Compounds of the above type are characterized by possessing a phenolic OH group, at least one methylol group and a long-chain aliphatic radical, and their physical and chemical properties as well as their practical utility in the arts are attributable directly to these three characteristics. Thus, the long-chain aliphatic radical endows the molecule with surface-active characteristics, especially water-repellency, which makes these intermediates useful for the manufacture of textile treating agents. The methylol groups enable the compounds to be condensed with salts of tertiary bases, converting the compounds into quaternary ammonium derivatives thereby rendering the entire molecule water-soluble. This enhances the desirability of these derivatives for use as textile treatment agents, wherein the most economical and most convenient method of application is obviously an aqueous bath.

According to our invention, these novel compounds are synthesized by causing formaldehyde to react with the respective substituted phenol of the formula

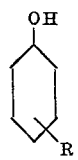

(wherein R has the same significance as above)
in the presence of an alkaline condensing agent. By choice of suitable proportions of formaldehyde, it is possible to introduce into the phenol radical one or two methylol radicals.

The conditions of the reaction in general follow the mode of operation usually employed in the synthesis of methylol compounds (see for instance, U. S. P. 2,146,392, British Patent No. 497,856 and British Patent No. 498,287), and may be carried out in aqueous medium, using an aqueous formaldehyde solution, or in an inert organic liquid medium using paraformaldehyde, trioxymethylene or other equivalent, organic-soluble, formaldehyde-yielding agent. As alkaline agent, one may employ an alkali-metal hydroxide or an alkali-metal carbonate.

The following examples, in which parts are by weight, illustrate but do not limit the invention.

Example 1

131 parts of technical dodecylphenol are stirred into 100 parts of water containing 25 parts of caustic soda, and 100 parts of a 37% aqueous solution of formaldehyde are then added. The mixture is cooled by surrounding the container with a vessel of cold water and stirred for 22 hours. Both the dodecylphenol and the reaction product are incompletely soluble in the reaction medium so that the liquid has the form of an emulsion. Saturated brine is then added to cause the oil to collect together. The liquid is allowed to separate into two layers and the aqueous layer is rejected. The oily liquid is washed by repeated shaking with saturated brine and is then neutralized by shaking with a sufficiency of 20% aqueous acetic acid. The emulsion so obtained is shaken with toluene and the toluene solution of the oil is separated off. This solution is well washed with water and dried over anhydrous magnesium sulphate. The toluene is then distilled off, whereby the carbinol is obtained as a brown oil. The product is believed to be a dimethylol derivative of dodecyl phenol, having the formula

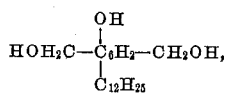

in which the $C_{12}H_{25}$ and the two $CH_2OH$'s occupy positions ortho and para to the OH group.

Example 2

138 parts of technical octadecylphenol are mixed with a solution of 20 parts of caustic soda in 130 parts of water, and 80 parts of a 37% aqueous solution of formaldehyde are then added. The mixture is cooled (by surrounding the containing vessel with a bath of cold water) and stirred at room temperature for 24 hours whereby an emulsion is formed. Saturated brine is then added to break the emulsion and the liquid is allowed to separate into two layers. The oily layer is removed, neutralized by shaking with 20% aqueous acetic acid and again separated off. It is then dissolved in toluene and the solution is washed by shaking with a further quantity of brine. The toluene solution of the oil is separated off and dried over anhydrous magnesium sulphate. The toluene is then distilled off under reduced pressure, whereby carbinol is obtained as a brown oil. The product is believed to be dimethylol-octadecyl-phenol of the formula

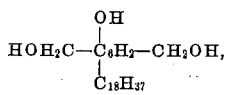

in which the $C_{18}H_{37}$ and the two $CH_2OH$'s occupy positions ortho and para to the OH group.

*Example 3*

19.5 parts of p-stearamidomethylphenol (M. P. 109° C., conveniently prepared by the method described in U. S. application Serial No. 245,768, filed December 14, 1938, in the names of Baldwin, Piggott and Statham) are dissolved in 130 parts of benzene at 65° C., 3.5 parts of potassium carbonate and 3.1 parts of para-formaldehyde are added and the mixture is stirred at 65° C. for 2 hours. It is then cooled to room temperature and filtered. Acetic acid is then added to the filtrate until it is neutral and then acetone is added and the mixture is cooled in ice, whereupon crude dimethylol-stearamidomethylphenol is precipitated. The mixture is filtered and the sticky residue is triturated with dilute aqueous acetic acid until it is neutral and is then filtered. The residue is washed with water and dried. It is then recrystallised from a mixture of benzene and acetone, whereby it is obtained in the form of a cream coloured powder of melting point 89° C. (with previous softening at 83° C.). Elementary analysis of this compound gives values agreeing with those for the formula $C_{17}H_{35}.CO.NH.CH_2.C_6H_2.(CH_2OH)_2.OH$ and the compound is believed to be 2-hydroxy-3-hydroxymethyl-5-stearamidomethyl-phenyl-carbinol.

*Example 4*

The process is the same as that of Example 3, except that instead of 3.1 parts of paraformaldehyde, 1.5 parts are used. The crude monomethylol-stearamidomethylphenol so obtained is recrystallised from benzene, whereby it is obtained in the form of a white power of M. P. 94° C. (with previous softening at 87° C.). Elementary analysis of this compound gave values agreeing with those for the formula $C_{17}H_{35}.CO.NH.CH_2.C_6H_2.(CH_2OH).OH$ and the compound is believed to be 2-hydroxy-5-stearamidomethyl-phenyl-carbinol.

If in the above examples instead of stearamidomethylphenol, stearamido-phenol be employed, the mono or dicarbinol of stearamido-phenol may be obtained.

As many apparently widely different embodiments of this invention may be made without departing from the spirit and scope thereof, it is to be understood that the invention is not limited to the specific embodiments thereof except as defined in the appended claims.

We claim:

1. As new organic compounds, the hydroxyphenyl-carbinols of the general formula

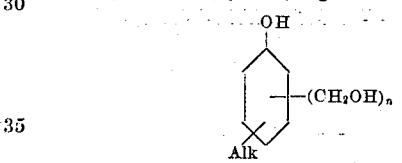

wherein Alk stands for an alkyl radical having from 12 to 18 carbon atoms in its structure, while $n$ is an integer less than 3.

2. Dimethylol-dodecyl-phenol.
3. Dimethylol-octadecyl-phenol.

REGINALD JOHN WILLIAM REYNOLDS.
ERIC EVERARD WALKER.